United States Patent [19]

Whiteside

[11] Patent Number: 5,013,007
[45] Date of Patent: May 7, 1991

[54] FLUSH VALVE REFILL RING

[75] Inventor: John F. Whiteside, Franklin Park, Ill.

[73] Assignee: Sloan Valve Company, Franklin Park, Ill.

[21] Appl. No.: 408,367

[22] Filed: Sep. 18, 1989

[51] Int. Cl.$^5$ .......................................... F16K 31/385
[52] U.S. Cl. .................................. 251/40; 251/38; 251/120; 251/123
[58] Field of Search .................... 251/120, 123, 40, 38

[56] References Cited

U.S. PATENT DOCUMENTS

| 2,012,255 | 8/1935 | Binnall | 251/40 X |
| 2,485,349 | 10/1949 | Barr | 251/120 |
| 3,656,499 | 4/1972 | Nelson et al. | 251/120 X |

FOREIGN PATENT DOCUMENTS 111208  8/1940  Australia .................... 251/40

Primary Examiner—Arnold Rosenthal
Attorney, Agent, or Firm—Kinzer, Plyer, Dorn, McEachran & Jambor

[57] ABSTRACT

A refill ring for use in a diaphragm-type flush valve is mounted upon the guide member of the diaphragm assembly. The refill ring has an outer diameter approximating the inner diameter of the flush valve passage adjacent the diaphragm seat. The refill ring has a plurality of recesses formed about its periphery whereby closure of the diaphragm assembly upon its flush valve seat moves the refill ring within the flush valve passage, the exterior of the refill ring being in contact with the interior of the passage such that the flow of water past the refill ring is limited to the area of the refill ring peripheral recesses.

4 Claims, 1 Drawing Sheet

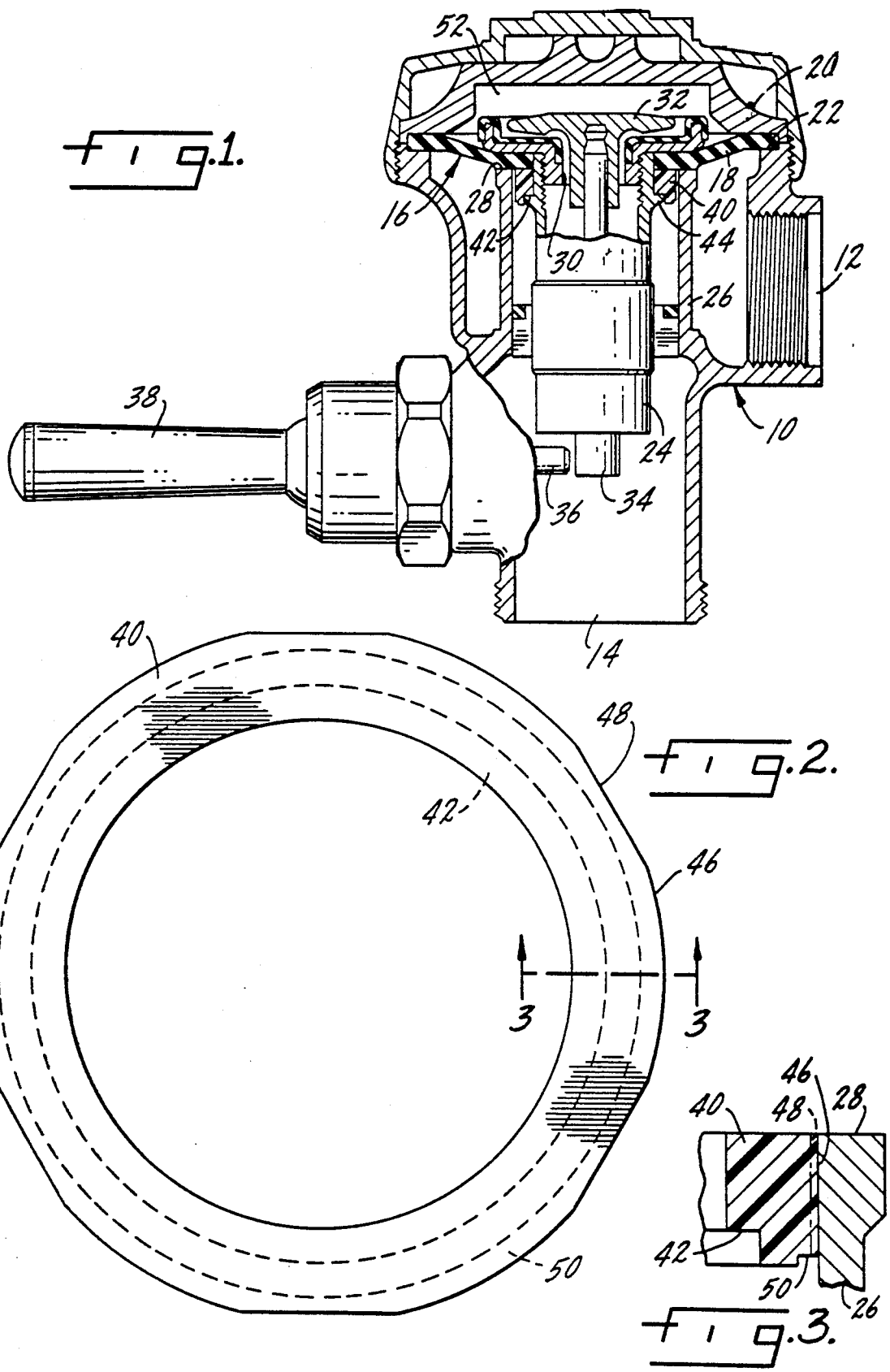

FLUSH VALVE REFILL RING

SUMMARY OF THE INVENTION

The present invention relates to flush valves of the type found in public washrooms and in particular to an improved refill ring for use with diaphragm-type flush valves.

The present invention is specifically directed to a refill ring for the use described which is relatively inexpensive to manufacture, but yet a refill ring which can closely control the flow of water past its exterior during closure of the flush valve.

Another purpose of the invention is a refill ring of the type described which fits tightly within the surrounding flush valve water passage, limiting the flow of water past the refill ring to a plurality of recesses formed in its exterior.

Other purposes will appear in the ensuing specification, drawings and claims.

BRIEF DESCRIPTION OF THE DRAWINGS

The invention is illustrated diagrammatically in the following drawings wherein:

FIG. 1 is a partial axial section through a diaphragm type of flush valve showing the improved refill ring of the present invention, FIG. 2 is an enlarged plan view of the refill ring of FIG. 1, and FIG. 3 is a section along plane 3—3 of FIG. 2 illustrating the relationship between the refill ring and the flush valve passage within which it fits.

DESCRIPTION OF THE PREFERRED EMBODIMENT

U.S. Pat. No. 3,656,499, assigned to the assignee of the present invention, describes a diaphragm-type flush valve and a refill ring for use in that flush valve which has been in commercial use for a number of years. The refill ring was specifically designed to quiet the closure of the diaphragm upon its seat during operation of the flush valve. The exterior of the refill ring has a plurality of grooves which are designed to reduce water turbulence during closure of the diaphragm assembly and there is an annular space about the periphery of the refill ring which forms a passage between the interior of the flush valve barrel and the exterior of the refill ring. As the diaphragm assembly is closed water flows through this passage, with the grooves which form the interior wall of the passage functioning to reduce turbulence and thus, noise. The presence of a very large number of vertical grooves in the periphery of that refill ring made the part expensive to manufacture and difficult to hold to tolerance. The result was that the flow of water past the refill ring during closure varied greatly because of the difficulty of precisely controlling the size of the passage about the exterior of the refill ring. The present invention is specifically designed to control the size of the water passage or passages about the exterior of the refill ring, but yet using a refill ring which is relatively inexpensive to manufacture and one which is extremely reliable in use.

In the drawings, a flush valve body is indicated generally at 10 and has an inlet 12 and an outlet 14. The diaphragm assembly is indicated generally at 16 and includes a flexible diaphragm 18 clamped about its periphery between an internal cover 20 and a shoulder 22 formed in the flush valve body 10. A guide member 24 is attached to the diaphragm and extends within a barrel 26 of the flush valve, the barrel forming a passage between the inlet and the outlet. At the top of the barrel there is a seat 28 upon which the diaphragm assembly closes.

The diaphragm is provided with a central opening 30 within which is positioned a relief valve 32, the lower end of which, indicated at 34, is positioned for contact by plunger 36. As is well known in the art, plunger 36 is operated by movement of handle 38. The description and function of the flush valve are more fully described in U.S. Pat. No. 3,656,499 and the disclosure of that patent is incorporated herein by reference.

The refill ring is indicated at 40 and may be formed of a suitable plastic material, for example Delrin or Celcon. The ring has a inwardly-facing peripheral recess 42 whereby the ring is mounted upon a shoulder 44 formed on the exterior of guide member 24. As more clearly indicated in FIG. 3, the outer periphery 46 of the refill ring has a diameter which closely approximates the inner diameter of barrel 26. Thus, the refill ring will tightly fit within the barrel when the diaphragm assembly is in the closed position of FIG. 1. The periphery of the refill ring has a plurality of recesses, the number may vary, as may the placement of the recesses. In the embodiment disclosed herein, the recesses are in the form of flatted areas 48 and there may be six such flatted areas about the periphery. Again, the particular form of the recess may vary and other recess configurations such as grooves, notches or the like, may be equally satisfactory. What is important is that the periphery of the refill ring, as indicated at 46, be in tight contact with the interior of the barrel 26 so that during closure of the diaphragm assembly the only water that flows past the refill ring is that which flows through recesses 48.

The refill ring may also include, at its outer periphery, a notch or groove 50 which is downwardly facing, but which may be upwardly facing if the refill ring is reversed in position, as is disclosed more fully in the above-mentioned '499 patent.

In operation, the diaphragm is held in the normally closed position of FIG. 1 by the pressure in chamber 52 above the diaphragm. Operation of handle 38 causes its plunger 36 to contact relief valve stem 34, tilting the relief valve, reducing the pressure in chamber 52, causing the diaphragm to lift off of its seat due to pressure at inlet 12. This opens the passage between inlet 12 and outlet 14.

Release of handle 38 returns the relief valve to its closed position on the diaphragm. Pressure rises in chamber 52 through a bypass, not shown, in the diaphragm. The diaphragm will close upon seat 28 near the end of the flushing cycle and as it does, the refill ring will close the passage through barrel 26 except for the flow through recesses 48. The refill ring derives its name from the fact that the small amount of water that passes around it just before seating of the diaphragm provides the small refill portion of water required to seal the trap of the water closet.

Of particular significance in the invention is the use of a refill ring which tightly fits within the flush valve barrel or the passage between the flush valve inlet and outlet. When the diaphragm assembly closes, the periphery of the ring is in tight contact with the interior of the barrel, restricting water flow past the refill ring during valve closure to only that amount which flows through the recesses. The configuration of the recesses, in this case flats, may be easily controlled during manufacture so that a precise amount of water may flow at this point in the flushing cycle. In prior refill rings, for example that shown in the '499 patent, the size of the passage between the exterior of the refill ring and the interior of the barrel varied considerably due to manufacturing tolerances. In the present invention the exterior of the refill ring and the interior of the barrel need not have close tolerances, providing that the refill ring fits tightly. Since the ring is plastic and the barrel is brass, the refill ring may be forced into the barrel during closure of the diaphragm assembly.

Whereas the preferred form of the invention has been shown and described herein, it should be realized that there may be many modifications, substitutions and alterations thereto.

The embodiments of the invention in which an exclusive property or privilege is claimed are defined as follows:

1. In a flush valve, a body having an inlet and an outlet, a passage connecting the inlet and outlet, a valve seat at one end of said passage, a diaphragm positioned to control the flow of water through said passage and to close upon said seat, a guide member attached to the bottom of said diaphragm and positioned within said passage, a solid refill ring attached to said guide member adjacent the diaphragm, said refill ring having an closely approximating the inner diameter of the passage, a plurality of recesses formed in the exterior of the refill ring, closure of said diaphragm upon said seat moves the refill ring within said passage, the exterior of the ring being in substantial circumferential contact with the interior of the passage, whereby the flow of water past said refill ring is limited to the areas of said refill ring recesses.

2. The flush valve of claim 1 further characterized in that said refill ring recesses include a plurality of flatted areas formed on the periphery of said ring.

3. The flush valve of claim 2 further characterized in that said flatted areas are generally uniformly spaced.

4. The flush valve of claim 3 further characterized in that said refill ring includes an outwardly-facing circumferential groove adjacent one end thereof.

* * * * *